(12) United States Patent
Zhao et al.

(10) Patent No.: US 11,059,936 B2
(45) Date of Patent: Jul. 13, 2021

(54) ORGANOFLUORINE MODIFIED EPOXY RESINS FOR INCREASING SURFACE FLASHOVER VOLTAGE, AND PREPARATION METHODS AND APPLICATIONS THEREOF

(71) Applicant: Hefei University of Technology, Anhui (CN)

(72) Inventors: Yushun Zhao, Anhui (CN); Kerong Yang, Anhui (CN); Jinhui Bai, Anhui (CN); Xuepei Wang, Anhui (CN); Yuanhan He, Anhui (CN)

(73) Assignee: Hefei University of Technology, Hefei (CN)

( * ) Notice: Subject to any disclaimer, the term of this patent is extended or adjusted under 35 U.S.C. 154(b) by 0 days.

(21) Appl. No.: 16/669,221

(22) Filed: Oct. 30, 2019

(65) Prior Publication Data
US 2020/0299455 A1 Sep. 24, 2020

(30) Foreign Application Priority Data
Mar. 22, 2019 (CN) .......................... 201910222472.4

(51) Int. Cl.
| | | |
|---|---|---|
| *C08G 59/30* | (2006.01) | |
| *C08G 59/24* | (2006.01) | |
| *C08K 5/00* | (2006.01) | |
| *C08K 5/1539* | (2006.01) | |
| *C08K 3/013* | (2018.01) | |
| *C08K 3/22* | (2006.01) | |
| *C08K 5/18* | (2006.01) | |

(52) U.S. Cl.
CPC ......... *C08G 59/308* (2013.01); *C08G 59/245* (2013.01); *C08K 3/013* (2018.01); *C08K 3/22* (2013.01); *C08K 5/0025* (2013.01); *C08K 5/1539* (2013.01); *C08K 5/18* (2013.01); C08K 2003/2227 (2013.01); C08L 2205/02 (2013.01)

(58) Field of Classification Search
CPC combination set(s) only.
See application file for complete search history.

(56) References Cited

FOREIGN PATENT DOCUMENTS

| | | | |
|---|---|---|---|
| CN | 101215367 A | * | 7/2008 |
| CN | 104448712 A | | 3/2015 |
| CN | 109852001 A | | 6/2019 |
| CN | 109942793 A | * | 6/2019 |

OTHER PUBLICATIONS

Machine translation of CN 109942793 A, retrieved Dec. 2020. (Year: 2020).*
Abayasinghe et al. "Terpolymers from Lactide and Bisphenol A Derivatives: Introducing Renewable Resource Monomers into Commodity Thermoplastics", Macromolecules, 2003, 36, 9681-9683 (Year: 2003).*

* cited by examiner

*Primary Examiner* — Nicole M. Buie-Hatcher

(57) ABSTRACT

The present invention discloses an organofluorine modified epoxy resin for increasing the surface flashover voltage, and preparation methods and applications thereof. In the present invention, the organofluorine modified epoxy resin is prepared from bisphenol A epoxy resin and hexafluorobisphenol A as raw materials in a mild environment in the presence of tri-(dimethylaminomethyl)phenol as a catalyst. Due to the reasonable proportion of the raw materials, the performance of the resin is optimized, the process is simple, and it is easy to realize industrial production. By using the modified resin as a matrix and adding a curing agent, a filler and an accelerant, a modified resin composite is prepared. In the present invention, a —$CF_3$ group is introduced in the epoxy resin without changing the surface state of the epoxy composite insulating material, the volume/surface resistivity of the material is reduced, it is less likely to accumulate charges on the material surface.

10 Claims, 4 Drawing Sheets

ORGANOFLUORINE MODIFIED EPOXY RESINS FOR INCREASING SURFACE FLASHOVER VOLTAGE, AND PREPARATION METHODS AND APPLICATIONS THEREOF

CROSS-REFERENCE TO RELATED APPLICATIONS

This application claims the benefit of priority from Chinese Patent Application No. CN201910222472.4, filed on Mar. 22, 2019. The content of the aforementioned application, including any intervening amendments thereto, is incorporated herein by reference in its entirety.

TECHNICAL FIELD

The present invention belongs to the field of modified resins, and in particular to an organofluorine modified epoxy resin for increasing the surface flashover voltage, and preparation methods and applications thereof.

BACKGROUND OF THE PRESENT INVENTION

In a DC transmission system, epoxy resin is widely applied in various devices such as DC converter valves, saturated reactors, DC bushings, gas insulated transmission lines (GILs) and gas insulated switches (GISs) due to its excellent insulation performance and mechanical performance. In a DC field, due to high insulation performance of the epoxy resin, it is very likely to accumulate, on the surface of the epoxy resin, a large number of surface charges with a long attenuation period because of injection of carriers. As a result, this may significantly reduce the insulation strength of the system or even result in surface flashover and breakdown, thereby threatening the operation safety of the power grid. With the rapid increase in the voltage level, the conventional epoxy resin castings have obvious charge accumulation in the DC field, which may cause significant reduction of the flashover field strength and the flashover voltage and thus lead to the surface insulation failure. Therefore, it is more and more important for process routes to improve the surface insulation strength by regulating the properties, especially the surface dielectric property, of the epoxy resin.

Among the researches on the regulation of charge accumulation on the surface of the epoxy composite insulating material, surface fluorination is a process of effectively regulating the surface morphology of the medium, the dynamic characteristics of charges and the flashover characteristics. A. Mohamad, Chuanyang Li, et al. proposed that the surface flashover voltage of the epoxy resin/$Al_2O_3$ composite insulating material was increased by surface fluorination. The reason is that the fluorination can increase the surface conductivity of samples, which facilitates the dissipation of surface charges, so that the electric field distortion caused by charge accumulation is weakened and the surface flashover voltage of the epoxy composite insulating material is eventually increased. However, the surface fluorination of the epoxy composite insulating material damages the compact three-dimensional cross-linked net structure on the surface and thus influences the aging performance of the epoxy composite insulating material.

SUMMARY OF THE PRESENT INVENTION

In order to solve the above problems, an objective of the present invention is to provide an organofluorine modified epoxy resin for increasing the surface flashover voltage, and preparation methods and applications thereof.

For this purpose, the present invention employs the following technical solutions.

An organofluorine modified epoxy resin for increasing the surface flashover voltage is provided, represented by the following molecular formula:

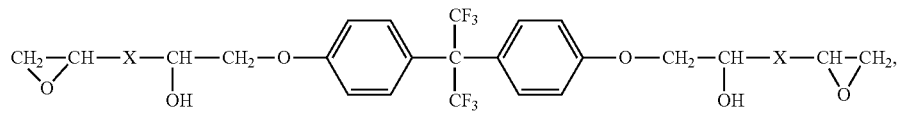

where:
X is

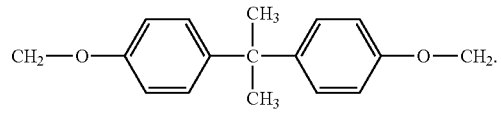

A method for preparing the organofluorine modified epoxy resin includes the following steps of:

(1) adding bisphenol A epoxy resin and hexafluorobisphenol A in a reactor, and uniformly stirring at a constant temperature of 130° C. to 170° C. to obtain a mixed solution; and (2) adding a catalyst in the mixed solution, uniformly mixing and reacting at 130° C. to 170° C. for 5 to 7 h to obtain the organofluorine modified epoxy resin.

Further, as a preferred technical solution, the catalyst is tri-(dimethylaminomethyl)phenol.

Further, as a preferred technical solution, the bisphenol A epoxy resin is E52 resin having an epoxide number of 0.51 mol/100 g to 0.54 mol/100 g.

Further, as a preferred technical solution, the mass ratio of the bisphenol A epoxy resin, the hexafluorobisphenol A and the catalyst is (610-635):(120-150):(70-80). More preferably, the mass ratio of the bisphenol A epoxy resin, the hexafluorobisphenol A and the catalyst is 628:134:76.2.

Another objective of the present invention is to provide an application of the organofluorine modified epoxy resin in a modified resin composite, specifically to prepare a modified resin composite based on the organofluorine modified epoxy resin. The modified resin composite contains the organofluorine modified epoxy resin, a curing agent, a filler and an accelerant, the mass ratio of which is (20-60):(10-40):(20-60):(0.05-0.1).

Further, a preferred technical solution, the curing agent is methyl tetrahydrophthalic anhydride (Me-THPA), the filler is $Al_2O_3$, and the accelerant is tri-(dimethylaminomethyl) phenol (DMP-30).

Further, as a preferred technical solution, the methyl tetrahydrophthalic anhydride has an acid number of 650-675 mgKOH/g.

A third objective of the present invention is to provide a method for preparing the modified resin composite, including the following steps of:

(1) uniformly mixing an organofluorine modified epoxy resin, a curing agent and an accelerant, adding a filler, and uniformly stirring at 120° C. to 140° C. to obtain a castable material; and (2) pouring the castable material into a die, standing at 110° C. to 130° C. for 2 to 4 h, and continuously standing at 130° C. to 150° C. for 15 to 25 h to obtain the modified resin composite.

Compared with the prior art, the present invention has the following beneficial effects.

(1) In the present invention, the organofluorine modified epoxy resin is prepared by modifying the bisphenol A epoxy resin by adding hexafluorobisphenol A in the bisphenol A epoxy resin. Then, a modified resin composite is prepared by using the modified resin as a matrix and adding a curing agent, a filler and an accelerant. By introducing the element F in the molecular chain of the epoxy resin, the volume/surface resistivity of the material can be effectively reduced, which is advantageous for dissipation of charges, so that the electric field distortion caused by charge accumulation is weakened, and the surface flashover voltage of the modified resin composite is eventually increased.

(2) In the present invention, the organofluorine modified epoxy resin is prepared from bisphenol A epoxy resin and hexafluorobisphenol A as raw materials in a mild environment in the presence of tri-(dimethylaminomethyl)phenol as a catalyst. Due to the reasonable proportion of the raw materials, the performance of the resin is optimized, the process is simple, and it is easy to realize industrial production.

(3) In the present invention, the bisphenol A epoxy resin is chain-extended and modified by hexafluorobisphenol A, and the C—F bond is introduced in the epoxy resin by synthesis, so that the surface state of the modified epoxy resin will not be damaged. In contrast, in the fluorine modification in the existing processes, based on the active chemical properties of fluorine, fluorine is reacted with molecules on the surface of the epoxy resin so as to change the molecular structure and the physical and chemical properties of the surface of the epoxy resin. Therefore, the surface state of the composite is inevitably influenced. In the present invention, without influencing the surface state of the epoxy composite insulating material, the surface flashover voltage of the epoxy resin composite is increased.

DETAILED DESCRIPTION OF THE PRESENT INVENTION

Figure 1:
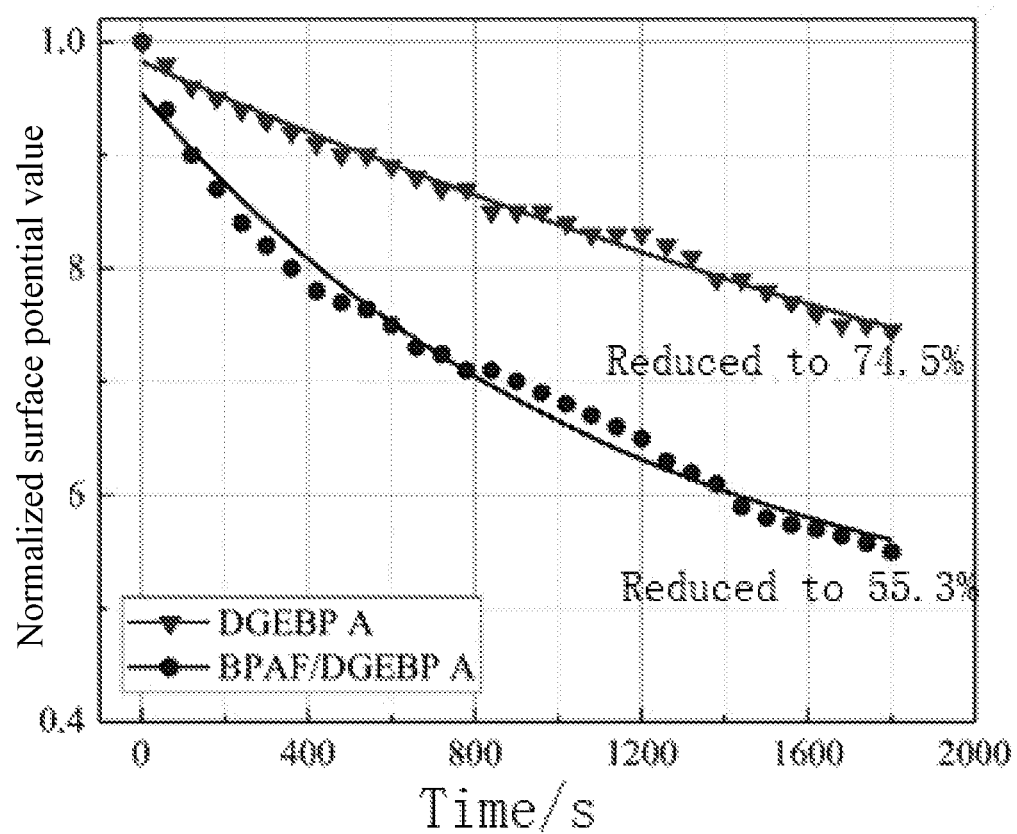
FIG. 1 is a view showing the surface potentialattenuation characteristics of the modified resin composite prepared in Embodiment 1 and the unmodified resin composite prepared in Comparison example 1.

In order to completely understand the objectives, features and effects of the present invention, the concept, generation and technical effects of the present invention will be clearly and completely described below by embodiments. Apparently, the embodiments to be described are merely some but not all of the embodiments of the present invention. All other embodiments obtained based on the embodiments of the present invention by those skilled in the art without paying any creative effort shall fall into the protection scope of the present invention.

The method for testing the performance of samples will be described below.

Surface potential attenuation characteristic test: at 20° C. and under a relative humidity of 50%, a 10 kV AC voltage is applied to corona charge the samples for 10 min, until charges are accumulated on the surfaces of the samples. At the end of charging, the magnitude of the surface potential and the attenuation characteristic of the surface potential are measured by a Treat-347 electrometer.

Volume/surface resistivity test: at 20° C. and under a relative humidity of 50%, the volume/surface resistivity is tested by a ZC36 megger.

Surface flashover voltage test: in the atmosphere of 0.2 MPa sulfur hexafluoride, the AC surface flashover voltages of the samples under different electric field uniformities are studied by needle-plate electrodes and semi-conical electrodes. An AC voltage is applied between the electrodes, at a linear rise rate of 2 kV/s, until the surface flashover occurs in the samples. The surface flashover voltage value at this moment is recorded. The samples cannot be reused once flashover occurs, and new samples are used for a second surface flashover voltage test. Total 10 tests are performed, and the 10 sets of the test data are processed by normal distribution. The voltage value having a normal distribution percentage of 50% is used as the final surface flashover voltage value.

Embodiment 1

Preparation of the Organofluorine Modified Epoxy Resin:

(1) 628 g of bisphenol A epoxy resin and 134 g of hexafluorobisphenol A were added in a reactor and then uniformly stirred at a constant temperature of 150° C. to obtain a mixed solution.

(2) 72.6 g of tri-(dimethylaminomethyl)phenol was added in the mixed solution, then mixed uniformly and reacted at 150° C. for 6 h to obtain the organofluorine modified epoxy resin.

The main reaction process was as follows:

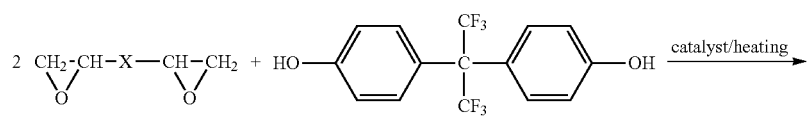

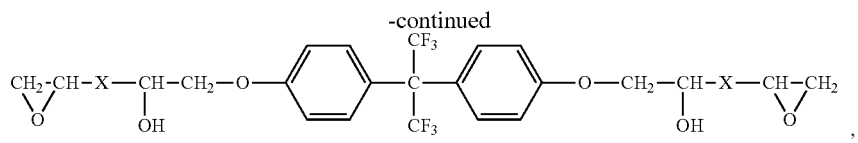

where X is

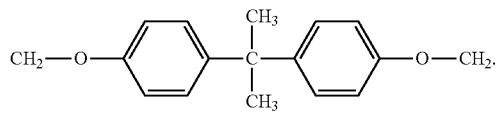

Preparation of the Modified Resin Composite:

(1) 166 g of methyl tetrahydrophthalic anhydride and 0.3 g of tri-(dimethylaminomethyl)phenol were added in 280 g of the organofluorine modified epoxy resin, then mixed uniformly, added with 300 g of $Al_2O_3$ filler, and stirred in a vacuum reaction kettle for 20 min at 130° C. and at 500 r/min to obtain a castable material.

(2) The castable material was poured into a die, and kept standing at 120° C. for 3 h and then at 140° C. for 20 h to obtain a modified epoxy resin composite having a diameter of 100 mm and a thickness of 1 mm.

Comparison Example 1

Preparation of the Unmodified Resin Composite:

Compared with Embodiment 1, in Comparison example 1, no organofluorine modified epoxy resin was used, and instead, an unmodified resin composite was prepared directly from bisphenol A epoxy resin as raw material. 392 g of bisphenol A epoxy resin was mixed uniformly with 332 g of methyl tetrahydrophthalic anhydride and 0.4 g of tri-(dimethylaminomethyl)phenol and then added with 300 g of $Al_2O_3$ filler. The mixture was stirred in a vacuum reaction kettle for 20 min at 130° C. and at 500 r/min to obtain a castable material. Subsequently, the uniformly-dispersed castable material was poured into a die, and kept standing at 120° C. for 3 h and then at 140° C. for 20 h to obtain an unmodified epoxy resin composite having a diameter of 100 mm and a thickness of 1 mm.

The surface potential attenuation characteristic test, the volume/surface resistivity test, the conical electrode surface flashover voltage test and the needle-plate electrode surface flashover voltage test were performed on the modified resin composite prepared in Embodiment 1 and the unmodified resin composite prepared in Comparison example 1. The test results were shown in FIGS. 1, 2, 3 and 4, respectively. In the drawings, the BPAF/DGEBP 1 was the modified resin composite sample prepared in Embodiment 1, and the DGEBP A was the unmodified resin composite sample prepared in Comparison example 1.

It could be found from FIG. 1 that, in the surface potential attenuation characteristic test, the surface potential value of the modified resin composite was finally reduced to 55.3% and the surface potential value of the unmodified resin composite was finally reduced to 74.5%. Thus, the surface potentialattenuation of the modified resin composite was faster than that of the unmodified resin composite.

Figure 2:
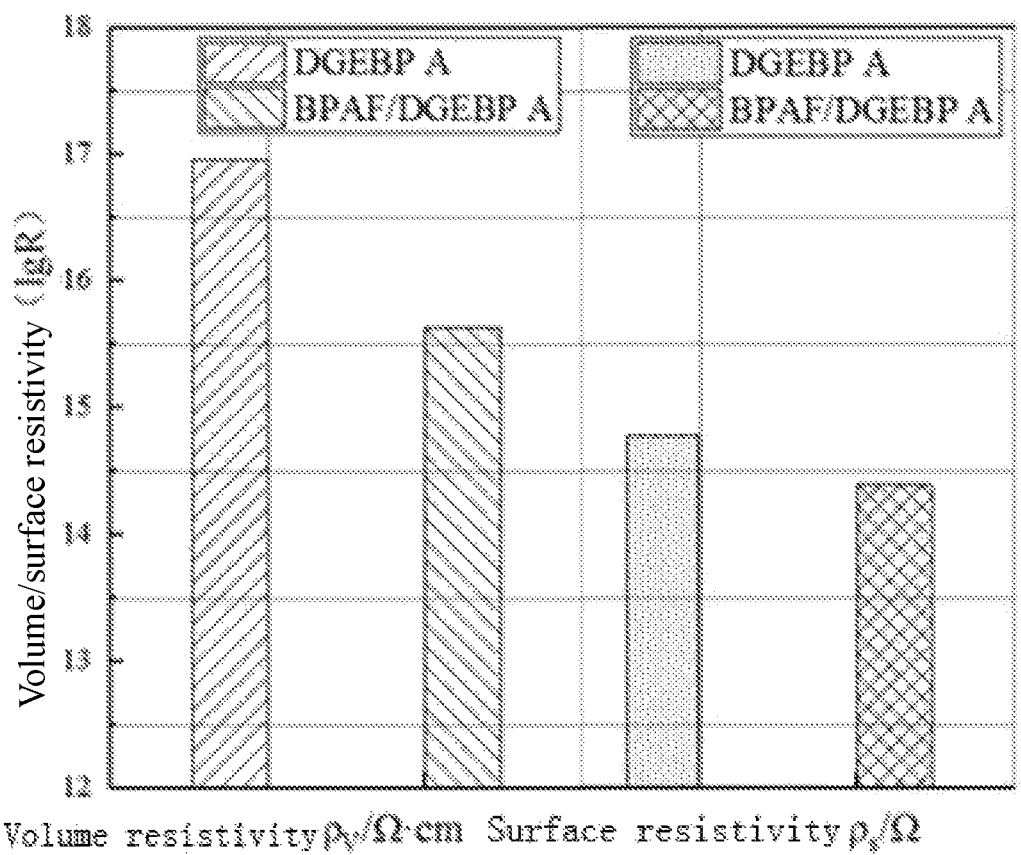
FIG. 2 is a view showing the volume/surface resistivity of the modified resin composite prepared in Embodiment 1 and the volume/surface resistivity of the unmodified resin composite prepared in Comparison example 1.
Figure 3:
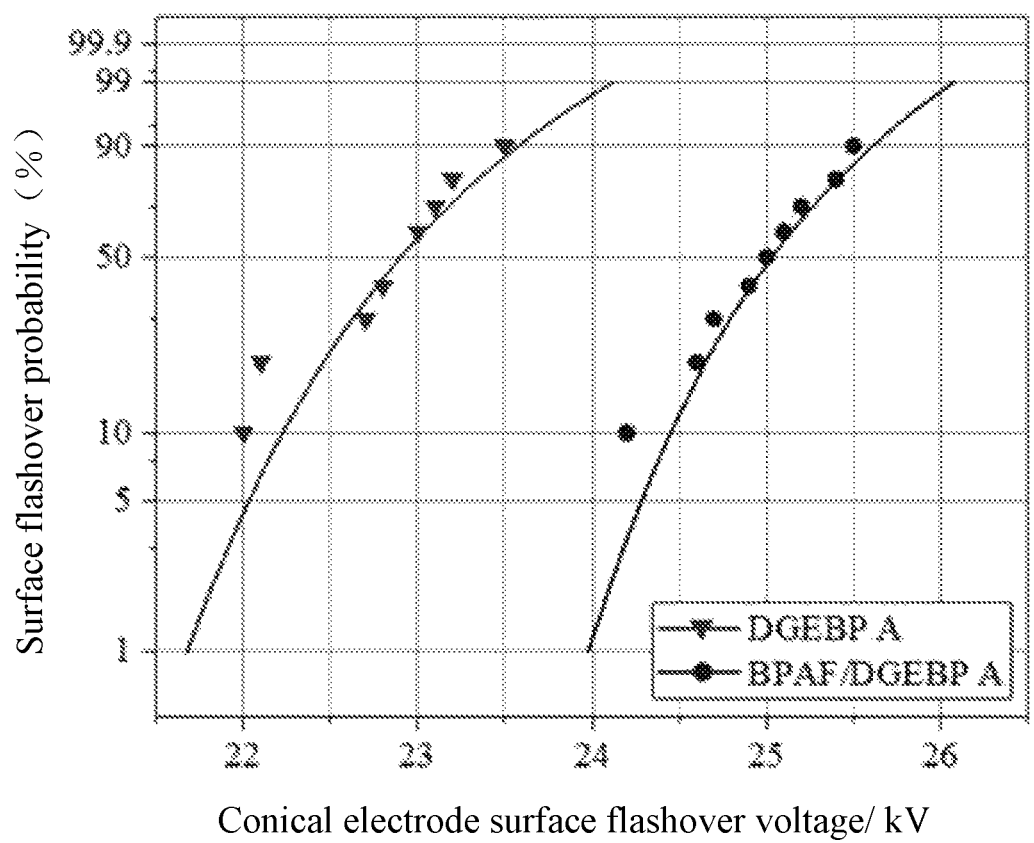
FIG. 3 shows the conical electrode surface flashover voltage of the modified resin composite prepared in Embodiment 1 and the conical electrode surface flashover voltage of the unmodified resin composite prepared in Comparison example 1.
Figure 4:
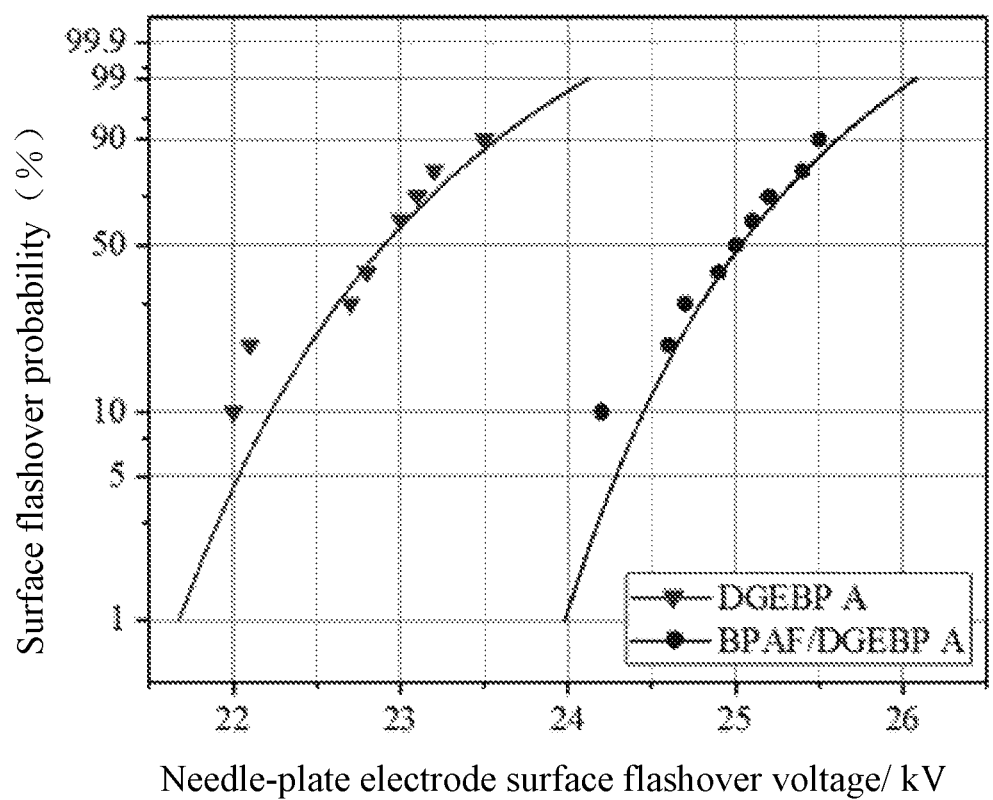
FIG. 4 shows the needle-plate electrode surface flashover voltage of the modified resin composite prepared in Embodiment 1 and the needle-plate electrode surface flashover voltage of the unmodified resin composite prepared in Comparison example 1.

It could be found from FIG. 2 that the volume/surface resistivity of the modified resin composite was lower than that of the unmodified resin composite. It could be found from FIGS. 3 and 4 that both the conical electrode surface flashover voltage and the needle-plate electrode surface flashover voltage of the modified resin composite were higher than those of the unmodified resin composite. Therefore, it is proved that, in the tests, by introducing the element F in the molecular chain of the epoxy resin, the volume/surface resistivity of the material can be effectively reduced, which is advantageous for dissipation of charges, so that the electric field distortion caused by charge accumulation is weakened, and the surface flashover voltage of the modified resin composite is eventually increased.

Embodiment 2

Preparation of the Organofluorine Modified Epoxy Resin:

(1) 610 g of bisphenol A epoxy resin and 150 g of hexafluorobisphenol A were added in a reactor and then uniformly stirred at a constant temperature of 130° C. to obtain a mixed solution.

(2) 70 g of tri-(dimethylaminomethyl)phenol was added in the mixed solution, then mixed uniformly and reacted at 130° C. for 5 h to obtain the organofluorine modified epoxy resin.

(1) 112 g of methyl tetrahydrophthalic anhydride and 0.2 g of tri-(dimethylaminomethyl)phenol were added in 186 g of the organofluorine modified epoxy resin, then mixed uniformly, added with 448 g of $Al_2O_3$ filler, and stirred in a vacuum reaction kettle for 20 min at 120° C. and at 500 r/min to obtain a castable material.

(2) The castable material was poured into a die, and kept standing at 110° C. for 4 h and then at 150° C. for 12 h to obtain a modified epoxy resin composite having a diameter of 100 mm and a thickness of 1 mm.

Embodiment 3

Preparation of the organofluorine modified epoxy resin:

(1) 630 g of bisphenol A epoxy resin and 120 g of hexafluorobisphenol A were added in a reactor and then uniformly stirred at a constant temperature of 170° C. to obtain a mixed solution.

(2) 80 g of tri-(dimethylaminomethyl)phenol was added in the mixed solution, then mixed uniformly and reacted at 170° C. for 7 h to obtain the organofluorine modified epoxy resin.

(1) 261 g of methyl tetrahydrophthalic anhydride and 0.3 g of tri-(dimethylaminomethyl)phenol were added in 321 g of the organofluorine modified epoxy resin, then mixed uniformly, added with 164 g of $Al_2O_3$ filler, and stirred in a vacuum reaction kettle for 20 min at 140° C. and at 500 r/min to obtain a castable material.

(2) The castable material was poured into a die, and kept standing at 130° C. for 2 h and then at 130° C. for 25 h to obtain a modified epoxy resin composite having a diameter of 100 mm and a thickness of 1 mm.

What is claimed is:

1. An organofluorine modified epoxy resin for increasing the surface flashover voltage, represented by the following molecular formula:

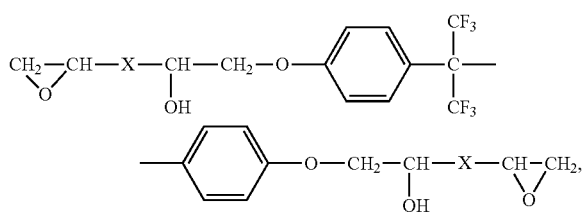

where X is

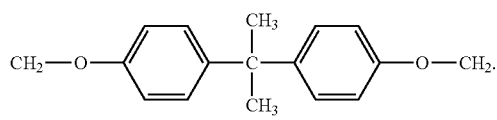

2. A method for preparing the organofluorine modified epoxy resin according to claim 1, comprising the following steps of:
(1) adding bisphenol A epoxy resin and hexafluorobisphenol A in a reactor, and uniformly stirring at a constant temperature of 130° C. to 170° C. to obtain a mixed solution; and
(2) adding a catalyst in the mixed solution, uniformly mixing and reacting at 130° C. to 170° C. for 5 to 7 h to obtain the organofluorine modified epoxy resin.

3. The method for preparing an organofluorine modified epoxy resin according to claim 2, wherein the catalyst is tri-(dimethylaminomethyl)phenol.

4. The method for preparing an organofluorine modified epoxy resin according to claim 2, wherein the bisphenol A epoxy resin has an epoxide number of 0.51 mol/100 g to 0.54 mol/100 g.

5. The method for preparing an organofluorine modified epoxy resin according to claim 2, wherein the mass ratio of the bisphenol A epoxy resin, the hexafluorobisphenol A and the catalyst is (610-635):(120-150):(70-80).

6. The method for preparing an organofluorine modified epoxy resin according to claim 5, wherein the mass ratio of the bisphenol A epoxy resin, the hexafluorobisphenol A and the catalyst is 628:134:76.2.

7. A modified resin composite based on the organofluorine modified epoxy resin according to claim 1, wherein the modified resin composite contains the organofluorine modified epoxy resin, a curing agent, a filler and an accelerant, the mass ratio of which is (20-60):(10-40):(20-60):(0.05-0.1).

8. The modified resin composite according to claim 7, wherein the curing agent is methyl tetrahydrophthalic anhydride, the filler is $Al_2O_3$, and the accelerant is tri-(dimethylaminomethyl)phenol.

9. The modified resin composite according to claim 8, wherein the methyl tetrahydrophthalic anhydride has an acid number of 650-675 mgKOH/g.

10. A method for preparing the modified resin composite according to claim 7, comprising the following steps of:
(1) uniformly mixing the organofluorine modified epoxy resin, a curing agent and an accelerant, adding a filler, and uniformly stirring at 120° C. to 140° C. to obtain a castable material; and
(2) pouring the castable material into a die, and letting it stand at 110° C. to 130° C. for 2 to 4 h and then at 130° C. to 150° C. for 15 to 25 h to obtain the modified resin composite.

* * * * *